United States Patent
Wada et al.

(10) Patent No.: US 9,919,926 B2
(45) Date of Patent: Mar. 20, 2018

(54) METHOD FOR PRODUCING RANDOM-STRUCTURE GIC, METHOD FOR PRODUCING EXFOLIATED GRAPHITE DISPERSION LIQUID, EXFOLIATED GRAPHITE DISPERSION LIQUID, AND EXFOLIATED GRAPHITE

(71) Applicants: SEKISUI CHEMICAL CO., LTD., Osaka, Osaka (JP); OITA UNIVERSITY, Oita, Oita (JP)

(72) Inventors: Takuya Wada, Osaka (JP); Akira Nakasuga, Osaka (JP); Masahiro Toyoda, Oita (JP)

(73) Assignees: SEKISUI CHEMICAL CO., LTD., Osaka (JP); OITA UNIVERSITY, Oita (JP)

( * ) Notice: Subject to any disclaimer, the term of this patent is extended or adjusted under 35 U.S.C. 154(b) by 0 days.

(21) Appl. No.: 14/760,467

(22) PCT Filed: Mar. 4, 2014

(86) PCT No.: PCT/JP2014/055420
§ 371 (c)(1),
(2) Date: Jul. 10, 2015

(87) PCT Pub. No.: WO2014/136757
PCT Pub. Date: Sep. 12, 2014

(65) Prior Publication Data
US 2015/0353361 A1    Dec. 10, 2015

(30) Foreign Application Priority Data

Mar. 6, 2013  (JP) ................................ 2013-044461
Nov. 8, 2013  (JP) ................................ 2013-232167

(51) Int. Cl.
C01B 31/04    (2006.01)
C01B 32/22    (2017.01)
(Continued)

(52) U.S. Cl.
CPC .......... C01B 31/0415 (2013.01); C01B 32/19 (2017.08); C01B 32/22 (2017.08); C01B 32/225 (2017.08)

(58) Field of Classification Search
CPC .............. C01B 31/015; C01B 31/0469; C01B 31/0423
See application file for complete search history.

(56) References Cited

U.S. PATENT DOCUMENTS 6,872,330 B2    3/2005  Mack et al.
2005/0205847 A1  9/2005  Dailly et al.
(Continued)

FOREIGN PATENT DOCUMENTS

CN    102431999 A    5/2012
CN    102701187 A    10/2012
(Continued)

OTHER PUBLICATIONS

Matsumoto, Rika, et al. "Alkali-metal-graphite intercalation compounds prepared from flexible graphite sheets exhibiting high air stability and electrical conductivity." Synthetic Metals 162.23 (2012): 2149-2154.*

(Continued)

*Primary Examiner* — Richard M Rump
(74) *Attorney, Agent, or Firm* — Cheng Law Group, PLLC

(57) ABSTRACT

The present invention provides a method for producing a random-structure GIC in which exfoliated graphite having a low regularity of a graphene stacked state and a small number of stacked graphene layers can be easily obtained by (Continued)

exfoliation treatment. The method includes the steps of providing an alkali metal-GIC having an alkali metal intercalated between graphene layers and bringing a polar protic solvent into contact with the alkali metal-GIC in a non-oxidizing atmosphere.

5 Claims, 6 Drawing Sheets

(51) Int. Cl.
　　　C01B 32/225　　(2017.01)
　　　C01B 32/19　　　(2017.01)

(56) References Cited

U.S. PATENT DOCUMENTS

| | | | |
|---|---|---|---|
| 2011/0046027 A1* | 2/2011 | Zhamu | C10M 103/02 508/113 |
| 2011/0130494 A1 | 6/2011 | Penicaud et al. | |
| 2013/0270119 A1 | 10/2013 | Wada et al. | |

FOREIGN PATENT DOCUMENTS

| | | |
|---|---|---|
| CN | 102815694 A | 12/2012 |
| JP | 2003-176116 A | 3/2003 |
| JP | 2003-238131 A | 8/2003 |
| JP | 2010-535690 A | 11/2010 |
| JP | 2011-32156 A | 2/2011 |
| JP | 2011-195432 A | 10/2011 |
| JP | 2012-131691 A | 7/2012 |
| WO | WO-2012/073861 A1 | 6/2012 |

OTHER PUBLICATIONS

Viculis, Lisa M., et al. "Intercalation and exfoliation routes to graphite nanoplatelets." Journal of Materials Chemistry 15.9 (2005): 974-978.*
Partial English translation of "Preparation of few-layer graphene by the hydroxylation of a potassium-graphite intercalation compound" (2014).*
Supplementary European Search Report for the Application No. EP 14 76 0133 dated Oct. 20, 2016.
Schlogl, R. et al., "The Reaction of Potassium-Graphite Intercalation Compounds with Water", Carbon, 1984, vol. 22, No. 4/5, pp. 351-358.
Akuzawa, Noboru, "Reactivity of Alkali Metal-Graphite Intercalation Compounds", Tanso, 2011, No. 248, pp. 96-101.
International Search Report for Application No. PCT/JP2014/055420 dated Apr. 1, 2014.
Written Opinion of International Searching Authority (PCT/ISA/237) for Application No. PCT/JP2014/055420 dated Apr. 1, 2014.
Written Opinion of International Searching Authority (PCT/ISA/237) for Application No. PCT/JP2014/055420 dated Apr. 1, 2014 (English Translation dated Sep. 17, 2015.

* cited by examiner

[FIG. 1]
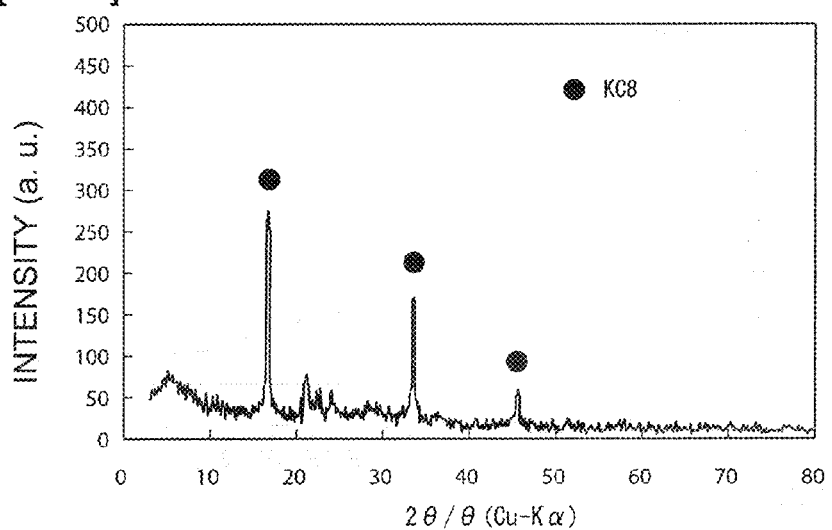
[FIG. 2]
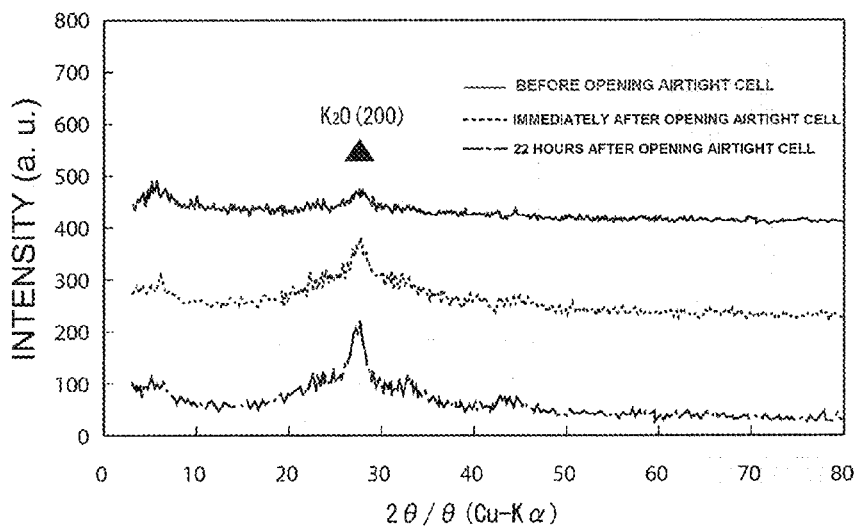
[FIG. 3]
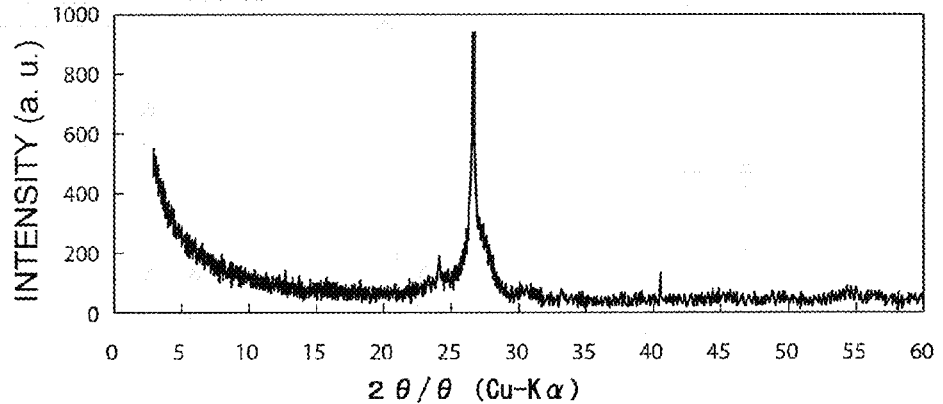

[FIG. 4]
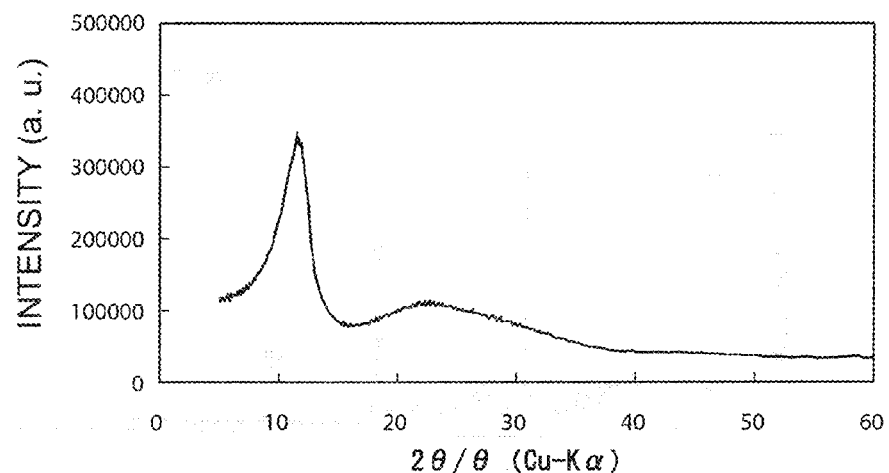
[FIG. 5]
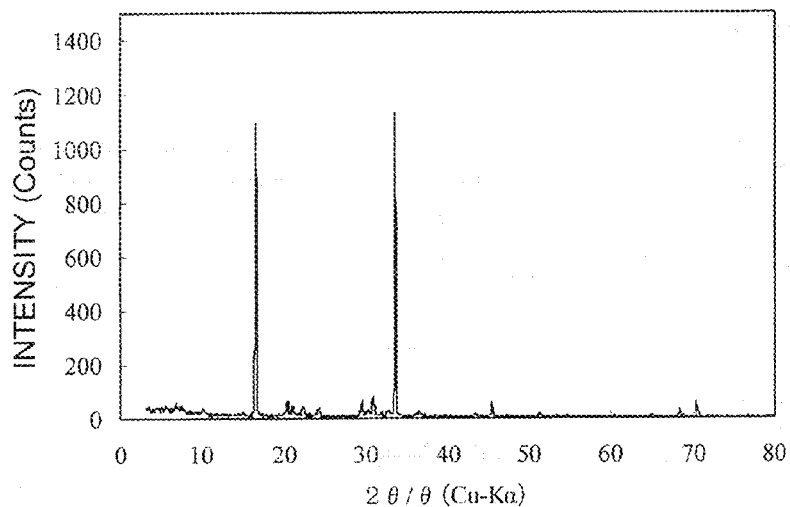
[FIG. 6]
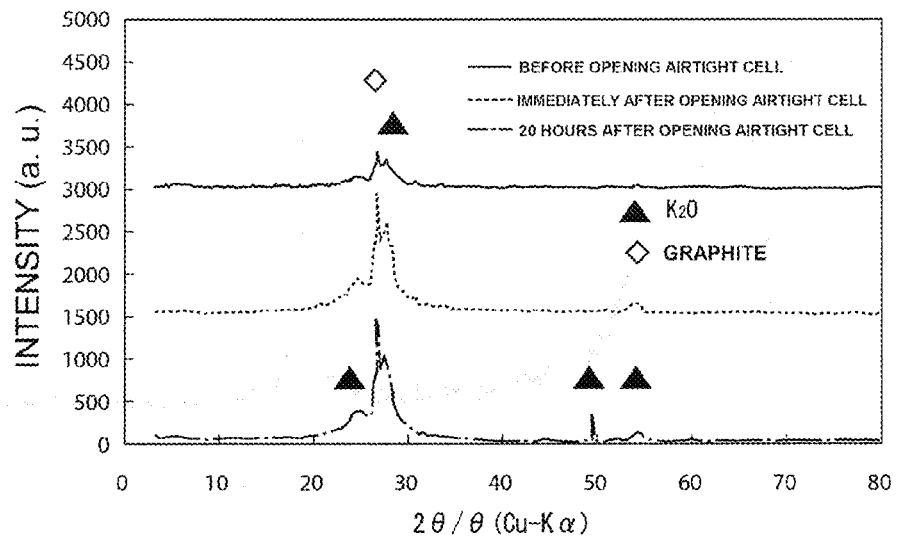

[FIG. 7]
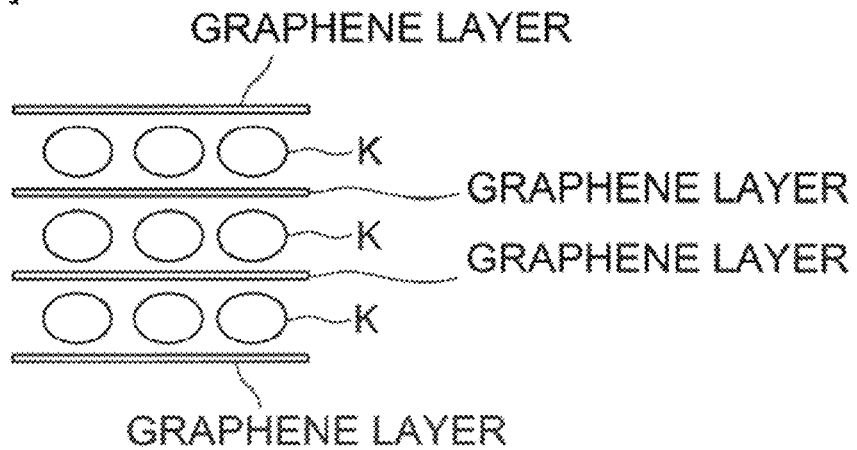
[FIG. 8]
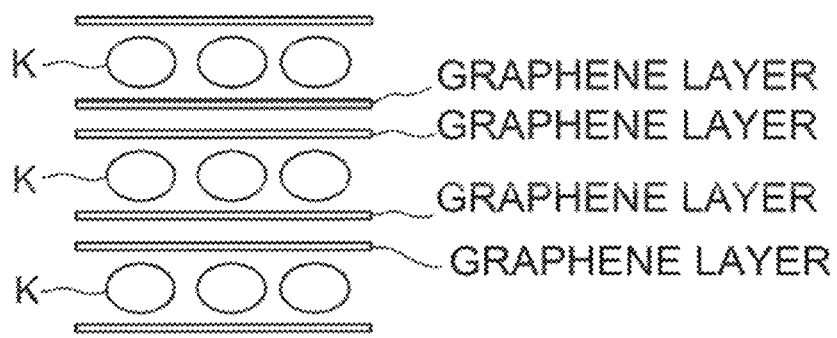
[FIG. 9]
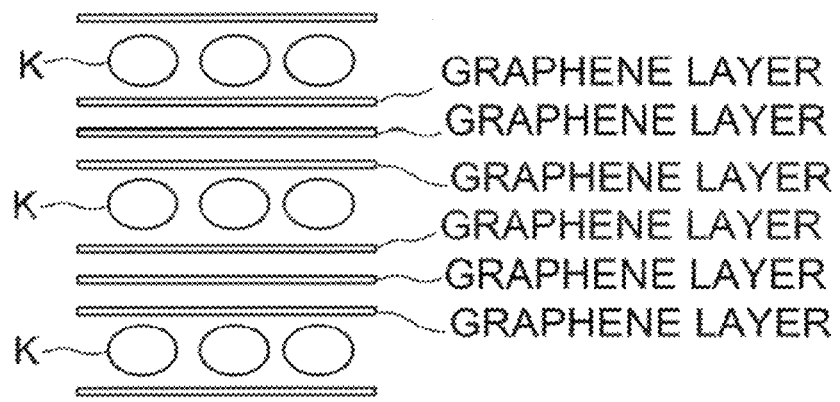

[FIG. 10]
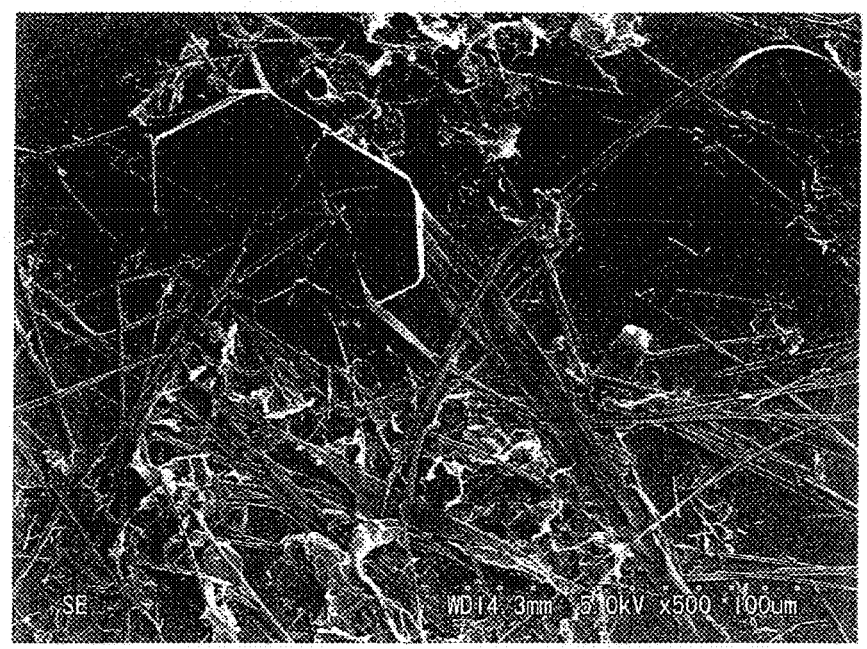
[FIG. 11]
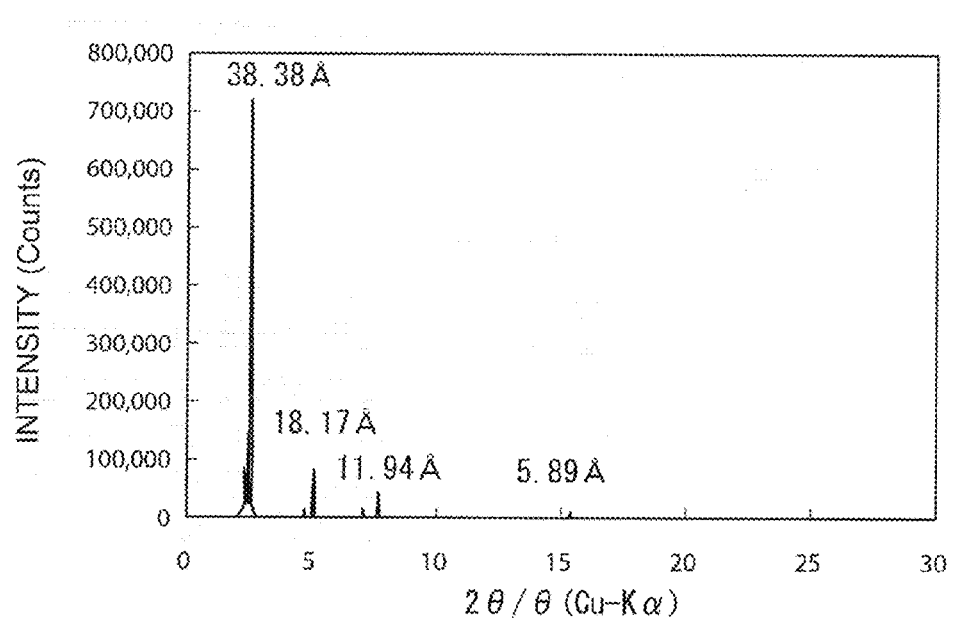

[FIG. 12]
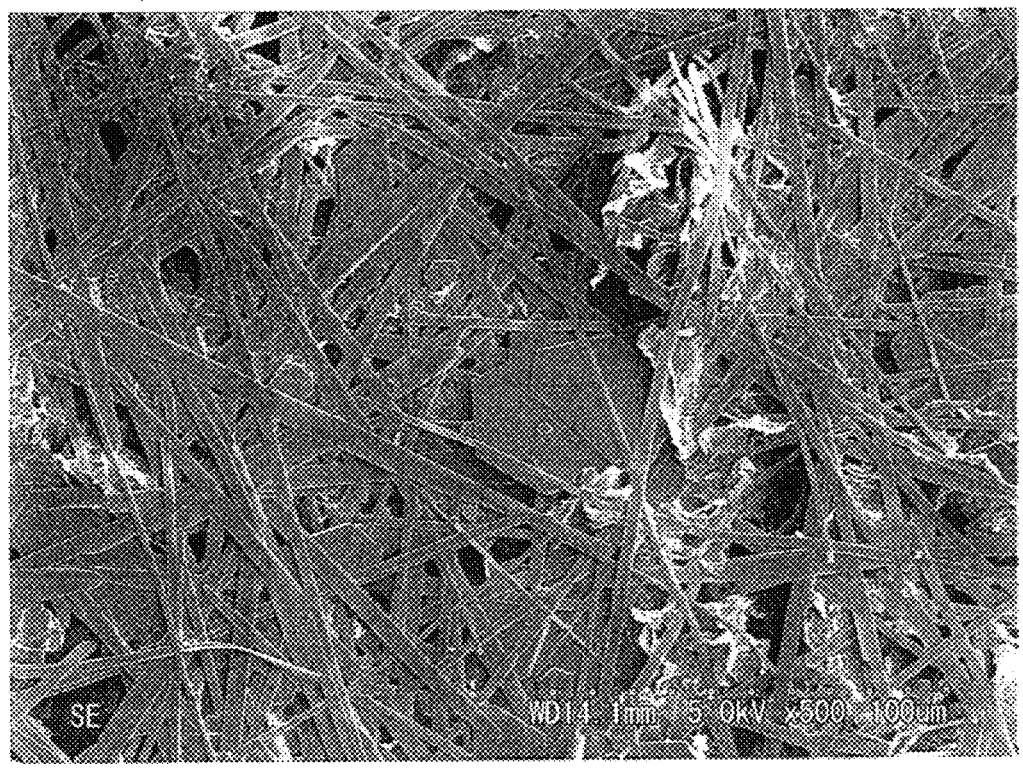
[FIG. 13]
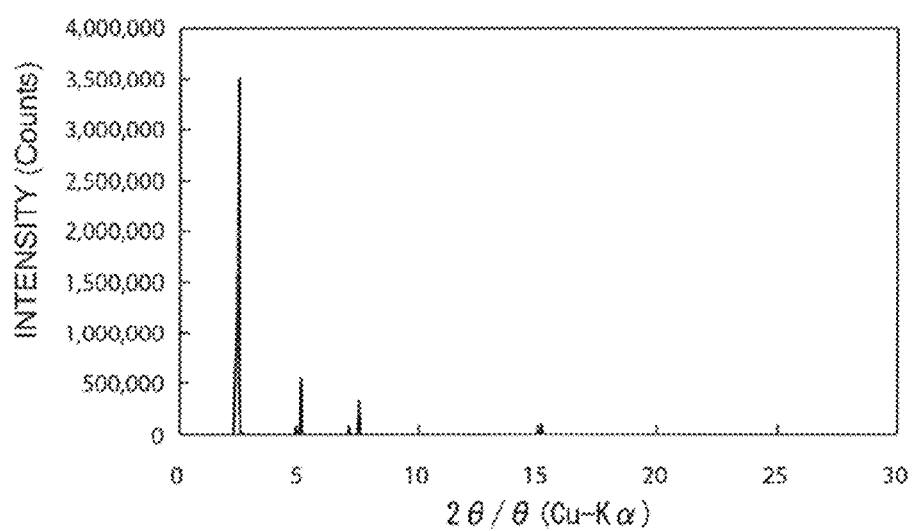

[FIG. 14]
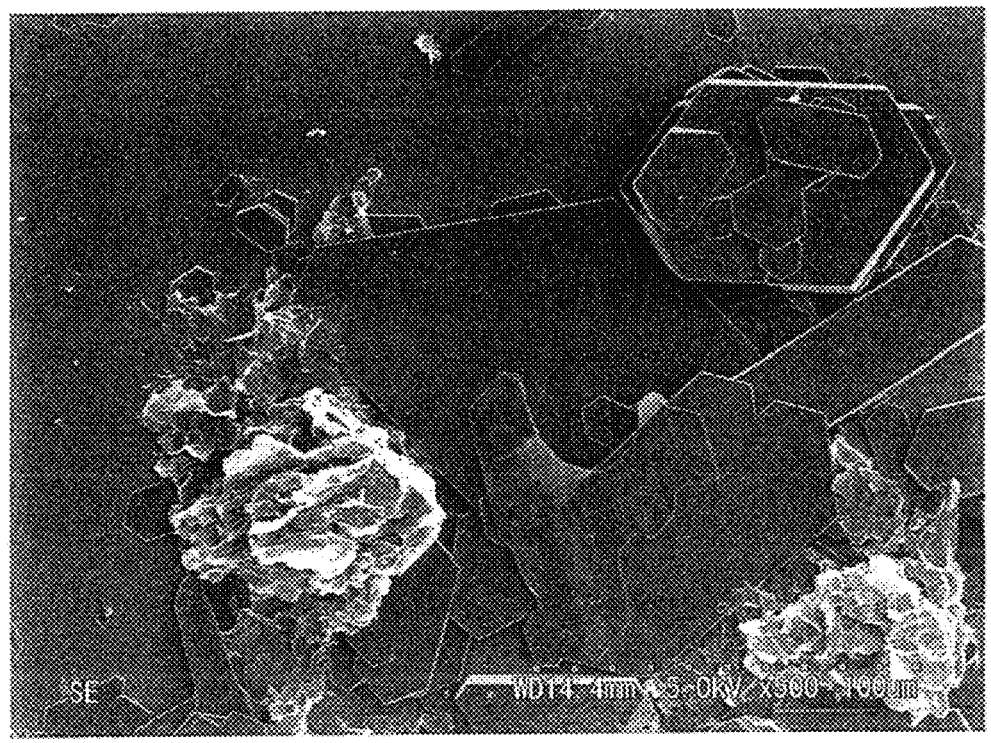
[FIG. 15]
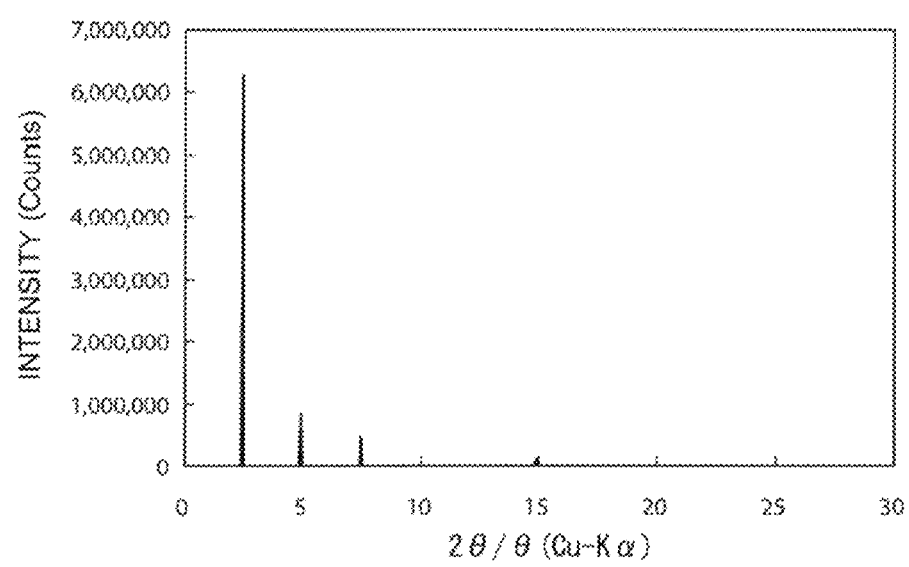

METHOD FOR PRODUCING RANDOM-STRUCTURE GIC, METHOD FOR PRODUCING EXFOLIATED GRAPHITE DISPERSION LIQUID, EXFOLIATED GRAPHITE DISPERSION LIQUID, AND EXFOLIATED GRAPHITE

TECHNICAL FIELD

The present invention relates to a method for producing GIC (graphite intercalation compound) having a random structure with little regularity derived from graphite. The present invention also relates to a method for producing an exfoliated graphite dispersion liquid using the GIC having the random structure, an exfoliated graphite dispersion liquid, and exfoliated graphite.

BACKGROUND ART

In recent years, exfoliated graphite having a small number of stacked graphene layers has attracted attention. A method for producing exfoliated graphite using GIC is known as a method for producing exfoliated graphite. In this method, an alkali metal is intercalated between the graphene layers of graphite. Then, graphite is exfoliated by ultrasonic treatment, heat treatment, or the like.

Non Patent Literature 1 to be described below describes the reactivity of an alkali metal-GIC prepared by intercalating K or the like between graphene layers as an alkali metal. Non Patent Literature 1 describes that when graphite is brought into contact with an alkali metal vapor to obtain an alkali metal-GIC and then the alkali metal-GIC is brought into contact with air, the structure of the alkali metal-GIC changes. That is, it is shown that, in addition to a peak of the structure of stage 1 represented by KC8, a peak of stage 2 represented by KC24 and a peak of stage 3 appear on an XRD spectrum.

On the other hand, Patent Literature 1 to be described below discloses a method for producing a graphene solution which facilitates the processing of a graphene-like carbon material. In this method for producing a graphene solution, graphite is first reduced with an alkali metal such as K, and the alkali metal is intercalated between graphene layers. Then, GIC is brought into contact with a polar aprotic solvent. Thereby, a graphene solution in which GIC is dissolved in the polar aprotic solvent is obtained.

CITATION LIST

Patent Literature

Patent Literature 1: Japanese Patent Laid-Open No. 2010-535690

Non Patent Literature

Non Patent Literature 1: Noboru Akuzawa "Compatibility of alkali metal-graphite intercalation compounds" (Carbon, 2011 [No. 248] pp. 96-101)

SUMMARY OF INVENTION

Technical Problem

Non Patent Literature 1 shows that, when K is intercalated and KC8, that is, an alkali metal-GIC of stage 1, is then brought into contact with air, the structures of stage 2 and stage 3 appear. However, although not only a peak of the structure of stage 1 but also peaks of the structures of stage 2 and stage 3 appear on an XRD spectrum, the regularity is not eliminated. Therefore, even if such an alkali metal-GIC is subjected to exfoliation treatment, it has been impossible to stably obtain exfoliated graphite having a small number of stacked layers.

Further, in Non Patent Literature 1, an alkali metal-GIC is dissolved in a polar aprotic solvent such as THF, but it has been difficult to sufficiently exfoliate graphite and obtain exfoliated graphite having a small number of stacked layers only by using the polar aprotic solvent.

An object of the present invention is to provide a method for producing a random-structure GIC in which exfoliated graphite having a low regularity of a graphene stacked state and a small number of stacked graphene layers can be easily obtained by exfoliation treatment. Other objects of the present invention are to provide a method for producing an exfoliated graphite dispersion liquid using the random-structure GIC, an exfoliated graphite dispersion liquid, and exfoliated graphite.

Solution to Problem

The method for producing a random-structure GIC according to the present invention comprises the steps of: providing an alkali metal-GIC having an alkali metal intercalated between graphene layers; and bringing a polar erotic solvent into contact with the alkali metal-GIC in a non-oxidizing atmosphere. Note that, in the present specification, the "random structure" refers to a structure where the regularity of a graphene stacked state derived from graphite is reduced, as will be described below.

In a certain aspect of the method for producing a random-structure GIC according to the present invention, the non-oxidizing atmosphere is an inert gas atmosphere. In this case, the polar protic solvent can be brought into contact with the alkali metal-GIC while reliably shielding oxygen.

In another specific aspect of the method for producing a random-structure GIC according to the present invention, the method further comprises a step of exposing the alkali metal-GIC to an oxygen-containing atmosphere after the step of bringing the polar protic solvent into contact with the alkali metal-GIC in the non-oxidizing atmosphere.

In another specific aspect of the method for producing a random-structure GIC according to the present invention, the oxygen-containing atmosphere is air. In this case, the simplification of operation of the production method and reduction in cost can be achieved.

In another specific aspect of the method for producing a random-structure GIC according to the present invention, the polar protic solvent is water or an alcohol, preferably water. In this case, reduction in cost can be achieved.

In a method for producing a random-structure GIC according to the present invention, at least one alkali metal selected from the group consisting of K, Li, Rb, and Cs is preferably used as the alkali metal.

In still another specific aspect of the method for producing a random-structure GIC according to the present invention, the step of providing the alkali metal-GIC is performed by bringing an alkali metal vapor into contact with graphite in vacuum. In this case, the alkali metal-GIC can be easily obtained.

The method for producing an exfoliated graphite dispersion liquid according to the present invention comprises the steps of: obtaining a random-structure GIC by the method for producing a random-structure GIC according to the present invention; adding the random-structure GIC to a nonpolar solvent or a polar solvent; and subjecting the random-structure GIC to exfoliation treatment in the nonpolar solvent or polar solvent to which the random-structure GIC is added, after adding the random-structure GIC to the nonpolar solvent or polar solvent.

In the method for producing an exfoliated graphite dispersion liquid according to the present invention, water or a lower alcohol is preferably used as the polar solvent. Alternatively, a solvent containing a surfactant is preferably used as the polar solvent.

Sodium lauryl sulfate is preferably used as the surfactant.

In another specific aspect of the method for producing an exfoliated graphite dispersion liquid according to the present invention, the concentration of sodium lauryl sulfate in the solvent containing sodium lauryl sulfate is in the range of 0.1% by weight or more and 10% by weight or less.

The exfoliated graphite dispersion liquid according to the present invention is obtained by the method for producing an exfoliated graphite dispersion liquid of the present invention.

The exfoliated graphite according to the present invention is obtained by removing a solvent from the exfoliated graphite dispersion liquid according to the present invention.

Preferably, the exfoliated graphite of the present invention has a longitudinal direction and a tape shape. In another specific aspect of exfoliated graphite of the present invention, a plurality of the tape-shaped exfoliated graphite having the longitudinal direction are assembled in the shape of a network so that the principal surfaces of the tape-shaped exfoliated graphite overlap.

In still another specific aspect of exfoliated graphite of the present invention, the exfoliated graphite has a hexagonal shape and a spacing between opposing edges of 10 μm or more.

Advantageous Effects of Invention

According to the method for producing a random-structure GIC according to the present invention, a polar erotic solvent is brought into contact with an alkali metal-GIC in a non-oxidizing atmosphere. Therefore, the regularity of a graphene stacked state is substantially eliminated, thus allowing to provide a random-structure GIC. Therefore, graphene layers are sufficiently exfoliated by subjecting graphite to well-known exfoliation treatment such as ultrasonic treatment and shear treatment, thus allowing to easily obtain exfoliated graphite having a small number of stacked layers and graphene.

Further, since the random-structure alkali metal-GIC obtained as described above has not passed through a process in which graphene is oxidized, a graphene-like carbon material such as exfoliated graphite which is excellent in electrical conductivity and thermal conductivity can be obtained by exfoliation treatment.

According to the method for producing an exfoliated graphite dispersion liquid according to the present invention, exfoliated graphite having a small number of stacked layers can be easily obtained by subjecting the random-structure GIC to exfoliation treatment. Particularly, since the exfoliation treatment is performed in the state where the random-structure GIC is added to the nonpolar solvent or polar solvent, it is also possible to provide a tape-shaped exfoliated graphite having a longitudinal direction or a network-shaped exfoliated graphite in which the tape-shaped exfoliated graphite are assembled so that the principal surfaces of the tape-shaped exfoliated graphite overlap.

BRIEF DESCRIPTION OF DRAWINGS

FIG. 1 illustrates an XRD spectrum of a gold-colored powder obtained by exposing expanded graphite to potassium vapor in Example 1.

FIG. 2 illustrates XRD spectra of dispersions before opening an airtight cell, immediately after opening an airtight cell, and 22 hours after opening an airtight cell in Example 1.

FIG. 3 illustrates an XRD spectrum of a powder obtained after evaporating ethanol from a dispersion liquid prepared by dispersing a random-structure GIC obtained in Example 1 in ethanol.

FIG. 4 illustrates an XRD spectrum of a graphene oxide film obtained by evaporating water from a dispersion liquid of graphene oxide obtained by the conventional Hummers method.

FIG. 5 illustrates an XRD spectrum of a gold-colored powder obtained by exposing natural graphite to potassium vapor in Example 2.

FIG. 6 illustrates XRD spectra of dispersions before opening an airtight cell, immediately after opening an airtight cell, and 20 hours after opening an airtight cell in Example 2.

FIG. 7 schematically illustrates an alkali metal-GIC having a structure of stage 1 when an alkali metal is K, that is, a structure of KC8.

FIG. 8 schematically illustrates an alkali metal-GIC having a structure of stage 2 when an alkali metal is K, that is, a structure of KC24.

FIG. 9 schematically illustrates an alkali metal-GIC having a structure of stage 3 when an alkali metal is K.

FIG. 10 illustrates an electron microscope photograph of exfoliated graphite obtained in Example 3.

FIG. 11 illustrates an XRD spectrum of exfoliated graphite obtained in Example 3.

FIG. 12 illustrates an electron microscope photograph of exfoliated graphite obtained in Example 4.

FIG. 13 illustrates an XRD spectrum of exfoliated graphite obtained in Example 4.

FIG. 14 illustrates an electron microscope photograph of exfoliated graphite obtained in Example 5.

FIG. 15 illustrates an XRD spectrum of exfoliated graphite obtained in Example 5.

DESCRIPTION OF EMBODIMENTS

Hereinafter, the present invention will be clarified by describing specific embodiments of the present invention.

As described above, the method for producing a random-structure GIC according to the present invention comprises the steps of providing an alkali metal-GIC having an alkali metal intercalated between graphene layers and bringing a polar protic solvent into contact with the alkali metal-GIC in a non-oxidizing atmosphere.

In the step of bringing a polar protic solvent into contact with the alkali metal-GIC in a non-oxidizing atmosphere in the present invention, a gas is generated by a reaction between an alkali metal and a polar protic solvent, and the gas pressure expands the distance between graphene layers to obtain an alkali metal-GIC having a random structure. An exfoliated graphite dispersion liquid, in which exfoliated graphite exfoliated from the alkali metal-GIC having a random structure is dispersed in a suitable solvent, is obtained by providing a step of further adding a suitable solvent to the alkali metal-GIC having a random structure and dispersing the alkali metal-GIC in the solvent using an ultrasonic wave or the like. When a suitable solvent is added to the alkali metal-GIC having a random structure as described above, the addition treatment may be performed in an oxygen-containing atmosphere. In this case, a polar protic solvent and an unreacted alkali metal are oxidized by oxygen, but the random structure of GIC is maintained even if the GIC is brought into contact with oxygen. Therefore, once a polar protic solvent is brought into contact with the alkali metal-GIC in a non-oxidizing atmosphere to prepare a random-structure GIC, the random-structure GIC may be exposed to an oxygen-containing atmosphere after that. That is, working efficiency can be significantly improved because subsequent steps can be performed in the air.

In the method for producing a random-structure GIC according to the present invention, an alkali metal-GIC having an alkali metal intercalated between graphene layers is first provided. In the step of providing an alkali metal-GIC, a conventionally known suitable method of intercalating an alkali metal between graphene layers of raw material graphite can be used.

The raw material graphite is not particularly limited, and suitable graphite such as natural graphite and expanded graphite can be used. Natural graphite is preferably used. Natural graphite has a low degree of oxidation as compared with expanded graphite or the like which has been subjected to acid treatment because natural graphite has not passed through a process of further oxidizing graphite. Therefore, when natural graphite is used, a graphene-like carbon material which is more excellent in electrical conductivity and thermal conductivity can be obtained.

Note that the expanded graphite refers to graphite in which the distance between graphene layers of graphite is expanded to a higher degree than natural graphite. Examples of such expanded graphite include product number: PF8 manufactured by Toyo Tanso Co., Ltd. When expanded graphite is used, an alkali metal can be intercalated between graphene layers more easily than natural graphite because the distance between graphene layers is expanded.

The alkali metal is not particularly limited, and at least one selected from the group consisting of K, Li, Rb, and Cs is preferably used as an alkali metal.

When an alkali metal-GIC having the alkali metal intercalated between graphene layers is provided, a conventionally well-known method of intercalating an alkali metal can be used. For example, an alkali metal can be intercalated between graphene layers by exposing raw material graphite to alkali metal vapor. More specifically, raw material graphite and an alkali metal are heated to a temperature at which the alkali metal can evaporate and then cooled, under a reduced pressure. Thereby, the alkali metal can be intercalated between graphene layers of raw material graphite to obtain an alkali metal-GIC.

When the alkali metal is K, the alkali metal-GIC obtained in this way has a structure of stage 1 illustrated in FIG. 7 according to a temperature condition. That is, an alkali metal-GIC represented by KC8 is obtained. In KC8, K is intercalated between adjacent graphene layers, and eight C atoms are arranged per one K atom.

Then, the step of bringing a polar protic solvent into contact with the alkali metal-GIC in a non-oxidizing atmosphere is performed. The non-oxidizing atmosphere is not particularly limited as long as oxygen can be shielded. However, it is desirable to use an inert gas atmosphere such as Ar or the like. This can reliably shield oxygen. Water or an alcohol is preferred as a polar protic solvent. This can more reliably prepare a random-structure GIC.

For example, when an alkali metal-GIC in which the alkali metal is K is brought into contact with water which is a polar protic solvent, the alkali metal-GIC absorbs water and changes from gold-colored KC8 to black.

As a result of extensive and intensive studies to solve the above problems, the present inventors have found that when a polar protic solvent is brought into contact with an alkali metal-GIC in a non-oxidizing atmosphere, a stage structure collapses and irregular random structure appears, and have completed the present invention.

Stage structures when an alkali metal is K will be described with reference to FIG. 7 to FIG. 9.

Here, the stage structures are structures schematically illustrated in FIG. 7 to FIG. 9, respectively. In the stage 1 illustrated in FIG. 7, the stage structure is represented by KC8 when the alkali metal is K. Here, one graphene layer and K are alternately stacked to form an intercalated structure. Further, in the stage 2 illustrated in FIG. 8, the stage structure is represented by KC24 when the alkali metal is K. Here, two graphene layers and K are alternately stacked to form an intercalated structure. Furthermore, in the stage 3 illustrated in FIG. 9, three graphene layers and K are alternately stacked to form an intercalated structure.

Then, when the alkali metal-GIC is brought into contact with a polar protic solvent and allowed to sufficiently react with each other in a non-oxidizing atmosphere, each of the stage structures as described above collapses to obtain a random-structure GIC.

Thus, each graphene layer in the structure of stage 1 will be stacked at random by the above treatment. Further, two graphene layers in the structure of stage 2 will be stacked at random by the above treatment. Similarly, in a higher-order stage structure, each unit composed of a graphene stack containing stacked layers in a number depending on the stage number will be stacked each other at random. That is, the random-structure GIC in the present invention has a structure in which when a graphene stack containing stacked layers in a number depending on the above stage number is defined as one unit, the units are stacked at random, so that the arrangement of the units may not have regularity. Therefore, in XRD spectra, peaks derived from graphite and structures such as stages 1 to 3 of an alkali metal-GIC hardly appear.

The reaction time is not particularly limited, but when an alkali metal-GIC is brought into contact with a polar protic solvent in a non-oxidizing atmosphere, the stage structure instantaneously collapses. Then, a color peculiar to each stage structure is lost, and the color turns black. Therefore, the reaction time may be instantaneous to 1 hour.

As will be obvious from Example 1 and Example 2 to be described below, when an alkali metal-GIC is brought into contact with the polar protic solvent, the regularity of graphene stacked layers in graphite is lost, and a random-structure GIC is obtained in which units depending on each stage structure are stacked at random.

Further, after bringing the polar protic solvent into contact with an alkali metal-GIC in a non-oxidizing atmosphere as described above, the alkali metal-GIC having a random structure may be exposed to an oxygen-containing atmosphere.

As a result, when an alkali metal is, for example, K, the following reaction probably occurs between a polar protic solvent, unreacted K and oxygen, producing $K_2O$.

$$4K + O_2 \rightarrow 2K_2O$$

In the random-structure GIC obtained as described above, graphene itself is not oxidized even if K may be oxidized. Since graphene has not passed through a process of oxidation, the random-structure GIC finally obtained has a low degree of oxidation and is hydrophobic. Therefore, a dispersion can be easily obtained by dispersing the random-structure GIC in a hydrophobic dispersion medium. A nonpolar organic solvent can be suitably used as the dispersion medium. Examples of such a nonpolar organic solvent include hexane, toluene, and xylene. It is also possible to easily obtain a dispersion by dispersing a random-structure GIC in a hydrophilic solvent containing a surfactant.

Such a surfactant is not particularly limited, and can be suitably selected and used from an anionic, a cationic, and a nonionic surfactant. A solvent containing water may be used as a polar solvent.

The present invention provides a random-structure GIC dispersion in which a random-structure GIC is dispersed in the above dispersion medium. Since such a random-structure GIC dispersion is in the state where the random-structure GIC is dispersed in a dispersion medium, the dispersion can be advantageously subjected to known exfoliation treatment such as ultrasonic treatment and shear treatment. Therefore, a dispersion liquid in which an exfoliated graphite having a small number of stacked layers or a graphene-like carbon material is dispersed can be easily obtained by performing a known exfoliation step by ultrasonic treatment or shear treatment. In order to extract exfoliated graphite or a graphene-like carbon material from a dispersion liquid in which exfoliated graphite or a graphene-like carbon material is dispersed, an existing method such as filtration, centrifugal washing, and drying can be used. Moreover, since graphene does not pass through an oxidation process as described above, an exfoliated graphite excellent in electrical conductivity and thermal conductivity or a graphene-like carbon material can be obtained.

(Method for Producing Exfoliated Graphite Dispersion Liquid)

In the method for producing an exfoliated graphite dispersion liquid according to the present invention, a random-structure GIC obtained by the method for producing a random-structure GIC according to the present invention is first provided.

Then, the random-structure GIC is added to a nonpolar solvent or a polar solvent. The nonpolar solvent or the polar solvent is not particularly limited, but water or an alcohol is suitably used as a polar solvent. Further, an aqueous solution containing a surfactant or a water-soluble polymer may be used as a polar solvent, and an aqueous solution containing an anionic surfactant is more preferably used. When an aqueous solution containing an anionic surfactant is used as a polar solvent, the random-structure GIC is first added to an aqueous anionic surfactant solution. Then, exfoliation treatment is performed in the state where the random-structure GIC is added to the aqueous anionic surfactant solution. Thereby, exfoliated graphite is obtained.

Examples of the anionic surfactant that can be used include sodium lauryl sulfate, triethanolamine lauryl sulfate, potassium lauryl phosphate, and sodium decanoate. Preferably, sodium lauryl sulfate is suitably used. As will be described below, elongated tape-shaped exfoliated graphite and exfoliated graphite having a large area and a small number of stacked layers can be easily obtained by using an aqueous sodium lauryl sulfate solution.

Examples of the water-soluble polymer that can be used include polyvinyl alcohol, polyvinyl pyrrolidone, polyethylene glycol, and polyallylamine.

The concentration of sodium lauryl sulfate in the solvent containing sodium lauryl sulfate (preferably aqueous sodium lauryl sulfate solution) is desirably 0.1% by weight or more and 10% by weight or less. When the concentration is in this range, exfoliated graphite can be more stably obtained according to the present invention. More preferably, the concentration of sodium lauryl sulfate in the solvent containing sodium lauryl sulfate is in the range of 2% by weight or more and 4% by weight or less, and in this case, elongated tape-shaped exfoliated graphite can be stably obtained. Exfoliated graphite, in which a plurality of elongated tape-shaped exfoliated graphite is assembled in the shape of a network so that the principal surfaces of the elongated tape-shaped exfoliated graphite overlap, can also be stably obtained. The concentration of sodium lauryl sulfate in the solvent containing sodium lauryl sulfate refers to the content of sodium lauryl sulfate in 100% by weight of the solvent.

Examples of the exfoliation treatment that can be used include a method of applying an ultrasonic wave to exfoliated graphite and a method of subjecting exfoliated graphite to stirring or high frequency induction. More preferably, the method of applying an ultrasonic wave is suitably used, and in this case, an exfoliated graphite dispersion liquid, in which exfoliated graphite having a small number of stacked layers is dispersed, can be stably obtained according to the present invention.

In the method for producing an exfoliated graphite dispersion liquid according to the present invention, an exfoliated graphite dispersion liquid, in which exfoliated graphite having a small number of stacked layers is dispersed, can be obtained by the above exfoliation treatment. Exfoliated graphite can be obtained by extracting exfoliated graphite from the dispersion liquid. Examples of the extraction method that can be used include, but is not particularly limited to, drying treatment such as air drying and vacuum drying, and solid-liquid separation by centrifugal washing or filtration.

Note that when the exfoliation treatment is performed without using an aqueous solution containing a surfactant, exfoliated graphite cannot be efficiently produced because exfoliated graphenes are re-stacked to produce graphite again. This is because graphene is aggregated or re-stacked because the exfoliated graphite obtained in the present invention is not oxidized.

The exfoliated graphite obtained by the present invention is exfoliated graphite obtained by exfoliation treatment using the above random-structure GIC as a raw material. Therefore, in the step of obtaining exfoliated graphite, graphene is not oxidized as described above. Therefore, exfoliated graphite excellent in thermal conductivity and electrical conductivity can be obtained.

Further, the exfoliated graphite obtained by the present invention preferably has a longitudinal direction and an elongated tape shape. In this case, excellent thermal conductivity and electrical conductivity are developed over the longitudinal direction. Furthermore, in the exfoliated graphite having a network structure in which the plurality of tape-shaped exfoliated graphite is assembled so that the surfaces of the tape-shaped exfoliated graphite overlap, the contact area between the plurality of exfoliated graphite is large. Therefore, the electrical conductivity and thermal conductivity can be further increased as compared with the aggregate of carbon nanotubes or carbon fibers.

Note that the elongated tape-shaped exfoliated graphite more specifically refers to those in which, when L represents length, W represents width, and T represents thickness, the relationship between L, W, and T is in the following range.

The relationship between L, W, and T is: L>5W and W>5T, preferably L>10W and W>5T.

In order to obtain the tape-shaped exfoliated graphite as described above, the concentration of the aqueous sodium lauryl sulfate solution containing sodium lauryl sulfate as an anionic surfactant is set, for example, to 2 to 4% by weight. Under this condition, it has been verified that the tape-shaped exfoliated graphite is obtained.

The exfoliated graphite according to the present invention is not limited to a tape-shaped exfoliated graphite, but may be exfoliated graphite having a hexagonal shape and a spacing between opposing edges of 10 μm or more. The graphite having a hexagonal shape can also be produced by a CVD method, but the hexagonal graphene which can be produced by a CVD method has a spacing between opposing edges of 5 μm or less. On the other hand, the spacing between opposing edges of the exfoliated graphite obtained in the present invention is, but not particularly limited to, larger than 10 μm. When, for example, an aqueous sodium lauryl sulfate solution which is an anionic surfactant is used, the exfoliated graphite having such a shape may be obtained by setting the concentration of the aqueous sodium lauryl sulfate solution to 5% by weight or more as in Example 5 to be described below.

Specific Examples will be described below. Note that the present invention is not limited to the following Examples.

EXAMPLE 1

To a glass cell which can be hermetically sealed were charged 0.1 g of expanded graphite (product number: PF8, manufactured by Toyo Tanso Co., Ltd.) as a raw material graphite and 1.5 g of potassium K. Note that a required amount was cut from aggregated potassium and subjected to surface washing treatment with petroleum ether, and the resulting potassium was used as a raw material potassium.

The glass cell was sealed while vacuum-sucking the glass cell from the opening thereof. A glass ampoule was formed in this way. This glass ampoule was heated in a tube furnace at a temperature of 350° C. for 48 hours. The heating rate was set to 350° C./hour. Then, the glass ampoule was cooled by natural air cooling. The glass ampoule was removed from the tube furnace after cooling, and the appearance of a powder inside the glass ampoule was observed. The powder inside the glass ampoule had a gold color. The glove box was filled with an argon gas atmosphere. The glass ampoule was broken in the glove box; the powder inside the glass ampoule was taken out; a small amount of the powder was dispensed into an airtight cell; and the airtight cell was used to measure an XRD spectrum while maintaining the argon gas atmosphere. The result illustrated in FIG. 1 was obtained.

As apparent from FIG. 1, it is found that, in the powder obtained as described above, the peak at 26.4 degrees derived from graphite has disappeared. Instead, it is found that the peaks at 16.6 degrees, 33.5 degrees, and 45.7 degrees all derived from KC8 have appeared. The peak at 16.6 degrees is probably the peak of the (001) diffraction line of KC8. The peak at 33.5 degrees is probably the peak of the (002) diffraction line of KC8. The peak at 45.7 degrees is probably the peak of the (003) diffraction line of KC8. Therefore, it was verified that the powder obtained as described above was KC8 having a structure of stage 1.

Then, 0.2 g of water was added to 0.1 g of the powder having a structure of KC8 remaining in the glove box, which was obtained as described above. As a result, the color of the powder changed to black in 1 to 2 seconds.

The black powder obtained as described above was set in the airtight cell in the above glove box. Then, the powder was subjected to XRD measurement while maintaining an argon gas atmosphere. The results are shown in FIG. 2. As apparent from FIG. 2, it is found that, in the state before opening the airtight cell, the peaks at 16.6 degrees, 33.5 degrees, and 45.7 degrees derived from KC8 have disappeared. Further, it is found that the peak at 26.4 degrees derived from graphite has also disappeared. Therefore, it is found that a random-structure GIC has been obtained.

Then, the airtight cell was opened to air after the above XRD measurement, and an XRD spectrum was again measured immediately after opening. In addition, the XRD measurement was performed again 22 hours after opening the airtight cell.

It is found that the peak in the vicinity of 28 degrees increases as the time passes from immediately after opening the airtight cell to 22 hours after opening the airtight cell. The peak in the vicinity of 28 degrees is probably a peak based on the (200) plane of $K_2O$. That is, it is likely that unreacted K remaining between graphene layers is brought into contact with oxygen in the air to produce $K_2O$. Anyway, it is found that the peak based on the regularity of the graphene stacked structure cannot be observed, but a random-structure GIC has been obtained.

Zero point one gram of the powder which is the random-structure GIC obtained as described above was dispersed in 20 mL of ethanol and subjected to ultrasonic treatment to obtain a dispersion liquid as a dispersion. The dispersion liquid was applied to a slide glass, and ethanol was evaporated by heating to dry the liquid. An XRD spectrum of the resulting film is illustrated in FIG. 3.

For comparison, an XRD spectrum of a conventional graphene oxide film is illustrated in FIG. 4. The conventional graphene oxide film has been obtained by evaporating water from a water dispersion liquid of graphene oxide obtained by the well-known Hummers method.

As apparent from FIG. 3, it is found that, in the film obtained by evaporating ethanol from the random-structure GIC dispersion obtained in Example 1, the original peak derived from graphite appears in the vicinity of 26.4 degrees. That is, it is likely that, since graphene is not oxidized, graphene layers has caused a π-π stack, and the peak derived from graphite has revived.

On the other hand, FIG. 4 illustrates that the peak derived from graphite oxide has appeared.

Therefore, it is found that a random-structure GIC containing graphene which is not oxidized has been obtained in Example 1.

EXAMPLE 2

A powder having a KC8 structure was produced in the same manner as in Example 1 except that natural graphite (natural graphite powder, product number: SN100, manufactured by SEC Carbon, Ltd.) was used as a raw material graphite instead of expanded graphite. A gold-colored powder was obtained also in Example 2, and a peak derived from KC8 was verified from the XRD spectrum. The result is illustrated in FIG. 5. As apparent from FIG. 5, the peaks at 16.6 degrees, 33.6 degrees, and 45.5 degrees derived from KC8 were verified also in Example 2 in which natural graphite was used. Further, the peak at 26.4 degrees derived from graphite had disappeared.

Then, the resulting gold-colored powder having a KC8 structure was brought into contact with water in an argon gas atmosphere in the same manner as in Example 1. As a result, the color changed to black also in Example 2.

The powder whose color changed to black as described above was set in an airtight cell in a glove box in the same manner as in Example 1 and subjected to XRD measurement while maintaining an argon atmosphere. Then, the airtight cell was opened; the black powder was brought into contact with air; and XRD measurement was performed immediately after opening the airtight cell and 20 hours after opening the airtight cell. The results are illustrated in FIG. 6.

As apparent from FIG. 6, it is found that, also in Example 2 in which natural graphite is used, the peaks derived from KC8 have disappeared, and a random-structure GIC has been obtained, by contact with water in the same manner as in Example 1. However, in the state before opening the airtight cell, the peak at 26.4 degrees based on the (002) plane of graphite has been observed a little, as illustrated in FIG. 6. Therefore, it is likely that the degree of exfoliation of graphene is a little low as compared with Example 1. This is probably because KC24 having a second stage structure was mixed. That is, this is probably because a reaction between potassium and water has not sufficiently proceeded since potassium is not present between some graphene layers. Therefore, it is likely that, in the portion where hydrogen gas is not generated, a layer in which exfoliation between graphene layers did not occur is produced, and the peak at 26.4 degrees derived from graphite remains a little.

However, it is found that, also in the state before opening the airtight cell in FIG. 6, the peak at 26.4 degree is small, and therefore, a random-structure GIC is almost obtained.

Further, as apparent from FIG. 6, it is found that the peak in the vicinity of 28 degrees derived from $K_2O$ is increased since the powder was brought into contact with air immediately after opening the airtight cell. Then, it is found that the size of the $K_2O$ peak has not changed even after the lapse of 22 hours from the opening. Therefore, it is found that, when a powder was brought into contact with air, the powder immediately reacted with oxygen, and K changed to $K_2O$.

EXAMPLE 3

To 20 mL of a 1% by weight aqueous sodium lauryl sulfate solution was added 0.1 g of the random-structure GIC powder obtained in Example 1, and thereto was further added potassium hydroxide so as to obtain a pH of 10. Then, an ultrasonic wave of 28 kHz/100 w was applied for 10 seconds using an ultrasonic cleaner, SANPA W-113, manufactured by Honda Electronics Co., Ltd. In this way, a dispersion liquid in which exfoliated graphite is dispersed was obtained.

The dispersion liquid obtained as described above was applied to the surface of a slide glass and dried. The dried sample was observed with an electron microscope. FIG. 10 illustrates a scanning electron microscope photograph of the resulting sample taken at a magnification of 500 times. As apparent from FIG. 10, it is found that elongated tape-shaped exfoliated graphite and generally hexagonal large exfoliated graphite are mixed. It is also found that the tape-shaped exfoliated graphite is assembled in the shape of a network so that the principal surfaces thereof overlap.

FIG. 11 illustrates an XRD spectrum of the sample. As apparent from FIG. 11, the peak at 26.4 degrees derived from graphite is not observed. The peak at 16 degrees derived from KC8 was not observed either. Further, it can be estimated from the XRD spectrum that the distance between layers is about 38 angstrom.

EXAMPLE 4

To 20 mL of a 3% by weight aqueous sodium lauryl sulfate solution was added 0.1 g of the random-structure GIC powder obtained in Example 1, and thereto was further added potassium hydroxide so as to obtain a pH of 10. Then, an ultrasonic wave of 28 kHz/100 w was applied for 10 seconds using an ultrasonic cleaner, SANPA W-113, manufactured by Honda Electronics Co., Ltd. In this way, a dispersion liquid in which exfoliated graphite is dispersed was obtained.

The dispersion liquid obtained as described above was applied to the surface of a slide glass and dried. The dried sample was observed with an electron microscope. FIG. 12 illustrates a scanning electron microscope photograph of the resulting sample taken at a magnification of 500 times. As apparent from FIG. 12, it is found that, in Example 4, a large number of elongated tape-shaped exfoliated graphite is stably formed. It is also found that the large number of elongated tape-shaped exfoliated graphite is assembled in the shape of a network so that the principal surfaces thereof overlap.

FIG. 13 illustrates an XRD spectrum of the sample. As apparent from FIG. 13, the peak at 26 degrees derived from graphite is not observed. The peak at 16.6 degrees derived from KC8 was not observed either.

Further, it can be estimated from the XRD spectrum that the distance between layers is about 38 angstrom.

EXAMPLE 5

To 20 mL of a 5% by weight aqueous sodium lauryl sulfate solution was added 0.1 g of the random-structure GIC powder obtained in Example 1, and thereto was further added potassium hydroxide so as to obtain a pH of 10. Then, an ultrasonic wave of 28 kHz/100 w was applied for 10 seconds using an ultrasonic cleaner, SANPA W-113, manufactured by Honda Electronics Co., Ltd. In this way, a dispersion liquid in which exfoliated graphite is dispersed was obtained.

The dispersion liquid obtained as described above was applied to the surface of a slide glass and dried. The dried sample was observed with an electron microscope. FIG. 14 illustrates a scanning electron microscope photograph of the resulting sample taken at a magnification of 500 times. As apparent from FIG. 14, it is found that, in Example 5, although elongated tape-shaped exfoliated graphite is partly observed, a large number of generally hexagonal exfoliated graphite having a large area have been obtained.

FIG. 15 illustrates an XRD spectrum of the sample. As apparent from FIG. 15, the peak at 26.4 degrees derived from graphite is not observed. The peak at 16.6 degrees derived from KC8 was not observed either. Further, it can be estimated from the XRD spectrum that the distance between layers is about 38 angstrom.

The invention claimed is:

1. A method for producing an exfoliated graphite dispersion liquid comprising the steps of:
    providing an alkali metal-GIC having an alkali metal intercalated between graphene layers;
    bringing a polar protic solvent into contact with the alkali metal-GIC in a non-oxidizing atmosphere to obtain a random-structure GIC;

adding the random-structure GIC to a nonpolar solvent or a polar solvent; and subjecting the random-structure GIC to exfoliation treatment in the nonpolar solvent or the polar solvent to which the random-structure GIC is added after adding the random-structure GIC to the nonpolar solvent or the polar solvent.

2. The method for producing an exfoliated graphite dispersion liquid according to claim 1, wherein water or a lower alcohol is used as the polar solvent.

3. The method for producing an exfoliated graphite dispersion liquid according to claim 1, wherein the polar solvent is a solvent containing a surfactant.

4. The method for producing an exfoliated graphite dispersion liquid according to claim 3, wherein the surfactant is sodium lauryl sulfate.

5. The method for producing an exfoliated graphite dispersion liquid according to claim 4, wherein the concentration of sodium lauryl sulfate in the solvent containing sodium lauryl sulfate is in the range of 0.1% by weight or more and 10% by weight or less.

* * * * *